United States Patent Office 3,157,614
Patented Nov. 17, 1964

3,157,614
NONELASTOMERIC MATERIALS CONTAINING PLATY TALC AND PROCESS OF PRODUCING SAME
Wilbur F. Fischer, Cranford, N.J., assignor to Esso Research and Engineering Company, a corporation of Delaware
No Drawing. Filed Sept. 1, 1960, Ser. No. 53,335
10 Claims. (Cl. 260—41)

This invention is concerned with a method for increasing the dielectric strength of various materials and more particularly it is concerned with the improved product therefrom. This application is a continuation-in-part of Serial No. 846,554, filed on October 15, 1959.

It is known to prepare a rubbery polymer, such as butyl rubber, and compound this polymer with various ingredients in conjunction with a subsequent cure to provide a unitary hard vulcanizate. In the past, the dielectric strength of the resulting vulcanizate has been relatively low and this has precluded the utilization of the end product in various commercial items where a high dielectric strength is the paramount characteristic. In the electrical field dielectric strength is important since the thickness of insulation is dependent upon this measurement. A high value is advantageous since less thickness is required in the insulation of electrical equipment in order to permit a safe operation at a given voltage.

It has now been discovered that the dielectric strength of a rubbery polymer can be substantially increased by compounding the rubber with a Mistron talc. Thus, in accordance with the first embodiment of this invention, a rubbery polymer, such as butyl rubber, is prepared and subsequently compounded with 20 to 200 parts of a Mistron talc, e.g., micaceous talc. The compounded rubber is then cured at elevated temperatures to provide a vulcanizate therefrom with a relatively high dielectric strength.

A second embodiment is the incorporation of the Mistron talc into solid non-elastomeric thermoplastic materials, such as polyolefins, like polypropylene, and polyvinyl chloride, and a compounded polyolefin. It is desirable to add mineral fillers to these thermoplastic materials for reasons of economic and processing advantages. The tolerance for different fillers, e.g., other talcs, clays, etc., varies and in particular, dielectric strength may decrease. With Mistron talc, however, the economic advantage is realized at no sacrifice in dielectric strength as compared to the unfilled thermoplastic. Furthermore, the talc may actually improve resistance to dielectric breakdown.

The Mistron talc can be employed in a third embodiment by incorporating it into a liquid polymeric oil such as a polydiolefin, and polyesters. This polydiolefin with this compounded therein is subsequently cured to provide a thermosetting resin having a high dielectric strength therein. It is also possible to form laminates with reinforcing elements therein.

A fourth embodiment is to add the instant Mistron talc to materials which are not polymers, e.g., wax and asphalt. The dielectric strength of these materials would also be increased.

The rubbery compounds to which this invention is applicable are any unsaturated rubbers, such as butyl rubber, natural rubber, neoprene (polychloroprene), SBR (the copolymer of major amounts of butadiene and minor amounts of styrene), ABR (the copolymer of butadiene with acrylonitrile) and Vistanex (polyisoolefin).

The butyl rubber polymer which is applicable to this invention is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. This polymer has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128. A halogenated derivative of butyl rubber, e.g., chlorinated or brominated butyl rubber, is within the scope of this invention. The preferred range of halogen substituted in the rubber structure is from 0.9 to 1.5 weight percent for chlorinated butyl rubber and 1.5 to 3.0 weight percent for brominated butyl rubber. It is also within the purview of this invention to utilize a polyisoolefin rubbery polymer. Polyisoolefins, e.g., polyisobutylene (Vistanex) can be prepared by the polymerization of isobutylene in the presence of suitable catalysts, preferably inorganic halides, e.g., boron fluoride at a temperature below 50° C. The detailed preparation of this polyisoolefin is described in U.S. Patent No. 2,130,507, which is also incorporated herein by reference. A third rubbery polymer which is preferred in the instant invention is SBR (GR–S) which is the copolymer of butadiene with styrene. The detailed procedure for preparation is disclosed in U.S. Patent No. 1,938,730, which is also incorporated herein by reference.

The butyl rubber, similarly to other rubbers, can be compounded with various other materials. Some examples of the types of materials that can be incorporated are as follows: stabilizers, plasticizers, fillers, accelerators, softeners, catalysts, and cross-linking agents. Compounding may be accomplished by subjecting the rubber to a severe mixing treatment in a Banbury at a temperature range of 75° F. to 500° F. This drastic treatment homogenizes the polymer and removes foci of impurities. Some compounding ingredients may be added during the working in this mixer. The treated polymer can then be worked on an open-roll mill with the addition of other compounding ingredients.

In accordance with this invention, 100 parts of a rubbery polymer are compounded with 20 to 200 parts by weight, preferably 80 to 140 parts of a Mistron talc. As defined in this invention, Mistron talcs are hydrous magnesium silicates of fine particle size and high surface area with an atomic structure of $(OH)_8Mg_{12}Si_{16}O_{40}$ or $(OH)_2Mg_3(Si_2O_5)_2$. These talcs are entirely different from other commercial talcs which contain tremolite, enstatite, diopside, carbonates, and quartz, as shown in Table I which compares the Mohs hardness for the various materials.

TABLE I

| Material: | Mohs hardness |
|---|---|
| Mistron | 1.0 |
| Kaolin (coating and filler clays) | 2.5 |
| Tremolite | 5.0–6.0 |
| Diopside | 5.0–6.0 |
| Quartz | 7.0 |
| Diamond | 10.0 |
| Calcite ($CaCo_3$) | 3.0 |
| Silica (diatomaceous silica) | 5.5–6.0 |
| Copper wire | 2.5–3.0 |

Furthermore, the difference is also exemplified in the comparison of the atomic structures as follows:

$$(OH)_4Mg_{10}(C)_4(A)_2Si_{16}O_{44}$$

or $(OH)_2Mg_5(C)_2(A)(Si_4O_{11})_2$ when $C=Mg^{++}$, $A=O$, then $(OH)_2Mg_7(Si_4O_{11})_2$—*anthophyllite*; when $C=Ca$, A=O, then $(OH)_2Ca_2Mg_5(Si_4O_{11})_2$—*tremolite* (Nytals Asbestine); when C=Ca$^{++}$ or Mg$^{++}$, and some Al$^{+++}$ substitutes for Si$^{++++}$, A=Na or K, then general *amphibole* formula results; $Mg_8(C)_8Si_{16}O_{48}$ or $Mg(C)(SiO_3)_2$ when C=Mg, then $Mg(SiO_3)$—*enstatite*; when C=Ca, then $MgCa(SiO_3)_2$—*diopside*. There are four general types of Mistron talcs which are: Fibrous or foliated, which are extremely soft in texture, snow white, and consist of short, soft fibers interspersed with platy particles; tremolitic or acicular, which are long, needlelike crystals; platy or micaceous, which have a platy particle shape; granular, which are dense and massive in structure. However, the preferred materials are the platy or micaceous Mistron talc. Thereare various grades of this specific type of talc which are within the purview of this invention and are produced by the Sierra Talc and Clay Company to include Sagger #7, Trinity Superfine, Mistron HGO-75, Mistron HGO-55, Mistron 25, and Mistron Vapor. A chemical and physical analysis of some of the specific talcs are indicated in Tables II and III herebelow:

TABLE II

| Chemical Analysis | Mistron Vapor, Percent | Mistron HGO-55 and Mistron 25, Percent | Pure Talc Mistron (Theoretical), Percent |
|---|---|---|---|
| H$_2$O$^-$ (loss at 105° C.) | 0.26 | 0.06 | |
| H$_2$O$^+$ (chemically combined) | 4.73 | 5.17 | 4.70 |
| SiO$_2$ | 62.51 | 59.65 | 63.40 |
| Al$_2$O$_3$ | 0.13 | 2.74 | |
| Fe$_2$O$_3$ | 0.99 | 0.55 | |
| MnO | trace | none | |
| TiO$_2$ | none | 0.01 | |
| CaO | 0.22 | 1.27 | |
| MgO | 30.59 | 30.09 | 31.90 |
| Na$_2$O | 0.09 | 0.21 | |
| K$_2$O | 0.03 | 0.03 | |
| CO$_2$ | 0.44 | 0.39 | |
| SO$_4$ | none | none | |
| Totals | 100.04 | 100.17 | 100.00 |

TABLE III

| Physical Analysis | Mistron Vapor | Mistron Micropaque |
|---|---|---|
| Free moisture, percent | .1-.3 | .1-.3 |
| Magnetizable iron | nil | nil |
| Grit | nil | nil |
| Salts of heavy metals deleterious to rubber | nil | nil |
| Particle shape | platy | (¹) |
| Approximate maximum particle size (microns) | .6 | 8 |
| Surface mean diameter (microns) | 0.55 | 0.65 |
| Specific surface (m.²/g.) | 19 | 12.7 |
| pH (1-5 slurry at 25° C.) | 9.0 | 9.73 |
| Specific gravity | 2.75 | 3.36 |
| Index of refraction (mean) | 1.59 | 2.15 |
| Brightness (percent reflectance at 457 millimicrons) | 86.5 | 99.0 |

¹ Platy/acicular/granular.

The compounded rubber with a micaceous talc therein is subsequently cured by any known method such as steam, press or mold curing. A particularly satisfactory method is to cure the compounded rubbery polymer in molds at a temperature between 150 and 165° C. for 20 minutes to 2 hours.

Thus, in accordance with the first embodiment of the present invention, a butyl rubber vulcanizate can be obtained therefrom with a relatively high dielectric strength. This new product has a dielectric strength (0.020″ thick pads) greater than 1,000 volts per mil, with the preferred range being between 1150 and 1380 volts per mil. Therefore, it is now possible to use this vulcanizate as an insulation for wires, cables, transformers and coils.

It is known to incorporate talcs, per se, into a rubbery polymer, U.S. Patent No. 2,833,731. However, these non-analogous talcs have relatively large particle size, e.g., 300 mesh or 50 microns in diameter. In contrast, the talcs employed in the instant invention are ultrafine and 50% of the particles have a maximum diameter of one micron and 100% have a maximum diameter of eight microns. It is unobvious that the present ultrafine platy talc will vastly increase the dielectric strength of various materials, e.g., a 153% increase in butyl rubber.

With respect to the second embodiment, thermoplastic polymers are defined as polymers that are capable of being repeatedly softened by increase of temperature and hardened by decrease of temperature. Thermoplastic applies to those materials whose change upon heating is substantially physical rather than chemical. Non-elastomers are defined as a polymer which at room temperature cannot be stretched repeatedly to at least twice its original length and, upon immediate release of the stress, will not return with force to its approximate original length. Polymers therefore, within the purview of this embodiment are polyolefins including mixed polyolefins and modified polyolefins and polyvinyl chloride. However, polyolefins are preferred. Generally, these non-elastomeric thermoplastic polymers have 10 to 150 parts of Mistron talc therein per 100 parts by weight of polymer.

Polyolefins are made from a monomer which contains 2 to 12 carbon atoms per molecule which includes therefore polyethylene, polypropylene, polybutene, polyheptene, and the like. The polyolefin, polyethylene and polypropylene being preferred, can be prepared by any known method. A suitable method is the polymerization at low pressures, e.g., 0 to 500 p.s.i.g., and low temperature, e.g., 0 to 100° C., in the presence of a catalyst. The catalysts used in this polymerization reaction are solid, insoluble reaction products obtained by reducing a reducible heavy transition metal compound, the metal component of which is taken from groups IVB, VIB, or VIII or manganese with a reducing organo-metallic compound of an alkali, alkaline earth, rare earth, or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR′AlX wherein R, R′, and X preferably are alkyl groups having from 2 to 8 carbon atoms, although X can be hydrogen or halogen, preferably chlorine. In addition to the catalyst, an inert hydrocarbon solvent, which is preferably a C$_3$ to C$_{18}$ paraffin, e.g., isopentane, n-heptane, and the like, may be used in the polymerization. The end product, e.g., polyethylene, generally has a molecular weight in the range of 12,000 to 500,000 or more. These polyolefins are discussed in detail in the Belgian Patent 533,362; Chemical and Engineering News, April 8, 1957, pages 12 to 16; and Petroleum Refiner, December 1956, pages 191 through 196, the subject matter of which is incorporated herein by reference.

The thermoplastic polymers which are not elastomers, e.g., polyolefins, are molded with the Mistron talc therein, generally at a temperature between 200° and 500° F., preferably 300 and 425° F. for 0.25 to 10 minutes, preferably 0.25 to 1.0 minute. In this second embodiment, the end product is a thermoplastic material which has unchanged or superior dielectric strength.

In accordance with the third embodiment, a thermosetting resin can have a Mistron talc incorporated therein. A thermosetting resin, as defined herein, is a resin which is capable of being changed into a substantially infusible or insoluble product when cured by application of heat or chemical means. This, therefore, included polydiolefins, mixed polydiolefin-olefin resins, polyesters, epoxies, phenolics, melamines, and silicones. However, the preferred curable polymers are the polydiolefins. The usual method for preparing a thermosetting resin is to provide a resinifiable polymeric mix comprising the curable polymer, e.g., a polydiolefin, a crosslinking agent and a peroxide catalyst. This mix can be subsequently cured to provide a hard end product therefrom. It is also within the purview of this invention to impregnate a reinforcing element, preferably paper, woven fabric, etc., as opposed to non-oriented glass fiber, with a resinifiable polymeric mix with subsequent curing to form a reinforced plastic laminate. The Mistron talc can be included in the aforementioned mixes with the range of 10 to 200 parts per 100 parts of curable polymer, preferably 30 to 100 parts.

The preferred polymeric oils included in the resinifiable mix in this invention can be prepared from conjugated diolefins, which have 4 to 6 carbon atoms per molecule, e.g., butadiene, hexadiene, isoprene, dimethyl butadiene, piperylene, and methyl pentadiene. Such diolefins may be copolymerized with minor amounts of ethylenically unsaturated monomers, e.g., styrene, acrylonitrile, methyl vinyl ketone, or with styrenes having alkyl groups substituted on the ring, e.g., paramethyl styrene, and dimethyl styrene. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymers of butadiene with styrene. The resulting product may vary in viscosity from 0.15 to 20 poises when tested as a 50% solution in Varsol. The preparation of this oil in the presence of an alkali metal or peroxide catalyst is promulgated in U.S. Patents 2,762,851 and 2,586,594, which are incorporated herein by reference.

Besides the curable thermosetting polymers and Mistron talc, this resinifiable mix of the third embodiment may also contain other monomeric crosslinking agents. Such monomers include the vinyl aromatics such as styrene, the vinyl toluenes, the dimethyl styrenes, the halogenated styrene, acrylic and methacrylic acid esters of monohydric alcohols; alkyl fumarates; allyl esters; vinyl esters, an acrylic acid ester of a polyhydric alcohol; and mixtures thereof. These additional crosslinking agents may be present within the range of 0 to 70% of the curable liquid mix, preferably 30 to 50%.

A catalyst may also be incorporated in the resinifiable mix within the range of 0.5 to 10 parts, preferably 2 to 4 parts. The catalyst is advantageously a free radical or peroxide type. A mixed catalyst consisting of dicumyl peroxide and ditertiary butyl peroxide is preferred. Benzoyl peroxide may also be employed in the mix, preferably in 0.5 to 1.0% concentration.

The reinforcing elements that are applicable to laminate in this invention include such items as mineral materials, e.g., glass, asbestos, mica, rock, and celite; vegetable materials, e.g., cotton, linen, rayon, and silk; organic materials, e.g., hair, nylon, and Orlon; and metallic materials, e.g., iron, aluminum, and copper. However, the preferred material is glass fiber. Glass fiber is defined herein as any fibrous glass unit to include filament yarns, rovings, reinforcing mats, staple yarns, woven fabrics, and chopped fibers. A protective size may be applied to glass fibers, e.g., polyesters, polyvinyl acetate and rubbery polymers. Glass fiber can also be treated with an unsaturated organic halo silane, e.g., a vinyl silane. The reinforcing elements, e.g., glass fiber, can be laminated with the aforementioned resinifiable polymer mix. A laminate, according to this invention, is defined as a composite mass of a reinforcing agent and a thermosetting resin, e.g., layers of cloth and resin. Lamination can be accomplished by any known procedure, e.g., the resin mix can be combined with glass cloth by brush impregnation. Thus, one method used in the manufacture of solid rectangular sheets, is to form layers of curable polymer mix and glass fiber.

Another method can be used for the manufacture of cylindrical hollow pipes wherein glass fibers can be dipped in the curable polymer mix and wound about a steel mandrel.

The resinifiable mix with or without the reinforcing elements therein can be subsequently cured to a thermosetting resin or a reinforced thermosetting laminate. This curing can be performed by any method known in the art. One suitable technique is to place in a press mold and heat to a temperature between 75 and 350° F. for 180 to 1 minute. An optional postcure can be conducted at a temperature between 75° and 250° F. for 120 to 30 minutes.

The end product of this third embodiment, which can either be a resin or, preferably a resin laminate, has a surprisingly high dielectric strength. Accordingly, electrical equipment, e.g., wires, can be coated with these resins and/or laminates and the thickness of insulation is substantially less than previously required therefor.

The addition of Mistron talc in a fourth embodiment can be performed with non-polymeric materials. These materials can include wax, asphalt, natural resins and esters thereof. A wax is defined in the present invention as an unctuous, fusible, variable viscous to solid substance having a characteristic waxy luster which is insoluble in water but soluble in most organic solvents. These waxes can be grouped according to their origin as animal, e.g., beeswax, stearic acid, Chinese insect wax; mineral, e.g., ozocerite, montan, ceresin, and paraffin; and vegetable, e.g., carnauba, Japan, bayberry, and candelilla. However, the preferred waxes of this invention are those which are obtained by artificial or synthetic means to include petroleum waxes, e.g., paraffin wax and microcrystalline wax, and chemically synthesized waxes, e.g., amides of saturated fatty acids. Asphalt is defined herein as a thermoplastic mixture of high molecular weight hydrocarbons with a small amount of sulfur, nitrogen, and oxygen compounds and is considered to be a colloidal suspension of contiguous hydrocarbons. This, therefore, encompasses "native," natural asphalts which are mined from fissures or pools close to the earth's surface; petroleum asphalts, e.g., straight reduced products and air-blown products; and coal tar pitches which are aromatic residues obtained in refining overhead products resulting from coking of coal. If 10 to 200 parts, preferably 30 to 100 parts are added to 100 parts of these materials, higher dielectric strength will result therefrom.

It is also within the instant utilization of Mistron talc in conjunction with butyl rubber to compound with 10 to 60 parts of titanium dioxide and any other desired ingredients heretofore described and to cure as per above to provide a superior white sidewall tire vulcanizate therefrom.

The following examples are submitted to illustrate, but not to limit this invention:

*Example 1*

A rubbery polymer was prepared comprising 98.0% of isobutylene with 2.0% of isoprene. One-hundred parts of this copolymer was compounded with various ingredients as indicated herebelow.

| Compounds: | Parts by weight |
|---|---|
| Zinc oxide | 5 |
| Stearic acid | 1 |
| Sulfur | 2 |
| Arazate [1] | 1.5 |
| Butyl zimate [2] | 1 |
| Altax [3] | 1 |

[1] Zinc dibenzyl dithiocarbamate.
[2] Zinc dibutyl dithiocarbamate.
[3] Benzothiazyl disulfide.

Various fillers were also compounded with the butyl rubber copolymer as shown in Table IV. Vulcanizates A, B, C, D, E, F, G, H, and I were provided by curing each compounded rubber in a press mold at 160° C. for 20 minutes. The dielectric strength of each vulcanizate was measured as indicated in Table IV herebelow:

TABLE IV

| Filler (parts by wt.) | A | B | C | D | E | F | G | H | I |
|---|---|---|---|---|---|---|---|---|---|
| Whiting [1] | 100 | 150 | 200 | | | | | | |
| Calcined clay [2] | | | | 100 | 150 | 200 | | | |
| Mistron vapor talc [3] | | | | | | | 100 | 150 | 200 |
| Dielectric Strength, 0.02" thick pad, volts per mil | 540 | 480 | 620 | 750 | 830 | 840 | 1,150 | 1,210 | 1,380 |

[1] Water ground calcium carbonate.
[2] Highly calcined kaolin clay.
[3] Micaceous talc.

The above example demonstrates that the dielectric strength of a rubbery polymer is vastly increased by compounding the rubber with a micaceous talc. In some instances the addition of micaceous talc resulted in an unobvious 153% increase over other electrical grade fillers such as whiting and/or calcined clay. Besides the high dielectric strength, the resulting vulcanizates have a high physical strength and excellent electrical water stability. It is now possible to decrease the thickness in the insulation of an electrical circuit and consequently faster continuous rates of vulcanization are possible, since the problem of thermal diffusion has been alleviated.

*Example II*

| Compound: | Parts by weight |
|---|---|
| Polymer | 100 |
| Stearic acid | 1 |
| Zinc oxide | 5 |
| Sulfur | 2 |
| Zinc dibenzyl dithiocarbamate | 1.5 |
| Zinc dibutyl dithiocarbamate | 1 |
| MBTS | 1 |
| Filler (as indicated) | 125 |

Table V indicates the various fillers which were also compounded into the rubbery polymer. After curing at 160° C. for 20 minutes the physical properties were determined as shown in Table V. It should be noted that the predominantly platy type of talc (micaceous talc) is superior.

TABLE V

| Filler | Type | Av. Particle Size | Tensile | Mod. 200% | Mod. 300% | Elong., Percent | Shore A | (h) | (i) | (j) | (k) |
|---|---|---|---|---|---|---|---|---|---|---|---|
| Whitetex Clay | (a) | | 750 | 250 | 275 | 600 | 59 | 2.99 | 0.39 | 4.5 | 705 |
| Triple A Mica | (b) | | 550 | 225 | 250 | 510 | 61 | 2.98 | 1.06 | 3.6 | 730 |
| Mistron Vapor Talc | (c) | 3 | 1,600 | 450 | 525 | 640 | 64 | 2.78 | 0.81 | 5.8 | 1,185 |
| Emtal 549 Talc | (c) | 5 | 1,325 | 375 | 425 | 630 | 63 | 2.74 | 0.37 | 5.6 | 1,165 |
| Emtal 500 Talc | (c) | 10 | 1,175 | 350 | 400 | 620 | 63 | 2.78 | 0.45 | 5.4 | 950 |
| Mistron 25 Talc | (c) | 1 | 1,450 | 450 | 550 | 620 | 63 | 2.85 | 1.10 | 4.8 | 1,235 |
| Mistron 18 Talc | (d) | 1 | 1,200 | 350 | 400 | 630 | 63 | 2.97 | 1.08 | 6.1 | 990 |
| Mistron T076 | (d) | 4 | 1,100 | 300 | 350 | 630 | 61 | 2.93 | 1.20 | 5.1 | 1,085 |
| Asbestine 325 | (e) | 6 | 950 | 200 | 250 | 670 | 55 | 3.19 | 1.33 | 4.8 | 740 |
| Asbestine 425 | (e) | 3 | 700 | 150 | 200 | 600 | 54 | 3.12 | 1.08 | 5.1 | 735 |
| Nytal 300 | (f) | 5 | 775 | 200 | 250 | 620 | 56 | 3.17 | 1.47 | 5.6 | 580 |
| Desertalc 57 | (g) | <15 | 975 | 300 | 350 | 620 | 60 | 2.98 | 1.05 | 5.1 | 1,010 |
| Desertalc 56 | (g) | <20 | 950 | 300 | 325 | 620 | 60 | 2.99 | 1.36 | 5.9 | 1,020 |

(a) Calcined.
(b) Electrical grade.
(c) Platy.
(d) Platy, fibrous.
(e) Fibrous, crystalline.
(f) Fibrous, acicular-granular.
(g) Platy, acicular.
(h) Dielectric Constant.
(i) Power Factor.
(j) D.C. Resistivity ohm-cm. × 10^14.
(k) Dielectric Strength.

*Example III*

A rubbery polymer (SBR) was prepared comprising 75% butadiene and 25% styrene. One-hundred parts of this copolymer were compounded with the same ingredients as indicated in Example I.

Talc fibers were compounded with the SBR rubber copolymer as shown in Table VI herebelow.

TABLE VI

| Filler | A | B |
|---|---|---|
| Asbestine 425 [1] | 125 | |
| Mistron vapor talc [2] | | 125 |
| Dielectric Strength, volts/mil | 1,300 | 1,600 |

[1] Fibrous-crystalline talc.
[2] Micaceous talc.

The above example again demonstrates the dielectric strength of a rubbery copolymer is increased by compounding with a micaceous talc.

*Example IV*

Polyethylene and polypropylene were compounded with different talcs as demonstrated in Table VII. Each compounded polyolefin was placed in a mold and heated at a temperature of 350° F. The dielectric strength of the resulting product was determined as per Table VII herebelow.

TABLE VII

| Compound | 1 | 2 | 3 | 4 | 5 | 6 | 7 |
|---|---|---|---|---|---|---|---|
| Polyethylene | 100 | 100 | 100 | | | | |
| Polypropylene | | | | 100 | 100 | 100 | 100 |
| Asbestine 425 [1] | | 30 | | | 30 | | |
| Mistron vapor talc | | | 30 | | | 30 | |
| Whitetex clay [2] | | | | | | | 30 |
| Dielectric strength, volts/mil | 1,800 | 1,780 | 1,910 | 2,100 | 1,850 | 2,045 | 1,450 |

[1] Fibrous crystalline talc.
[2] Calcined electrical grade clay.

It is manifest from this example that Mistron talc gives superior results than other types of talc and especially electrical grade clay, in maintaining or improving the original high dielectric strength of the thermoplastic polymer.

*Example V*

A curable liquid polymeric oil can be provided from the following compounds: butadiene-1,3, 80 parts; styrene, 20 parts; Varsol,[1] 200 parts; dioxane, 40 parts; isopropanol, 0.2 parts; sodium,[2] 1.5 parts.

[1] Straight-run mineral spirits; API gravity, 49.0; flash, 105° F.; boiling range, 150° to 200° C.; solvent power, 33–37 Kauri-Butanol value (reference scale: Benzene-100 K.B. Value, n-heptane 25.4 K.B. value).
[2] Dispersed to a particle size of 10 to 50 microns by means of an Eppenbach homo-mixer.

The polymerization can be performed at 50° C. in a 2-liter autoclave equipped with a mechanical agitator. The resulting product had a viscosity of 1.5 poises at 50% NVM in Varsol solution and the non-volatile portion thereof had an average molecular weight of about 8,000.

Resinifiable polymer mixes can be prepared with the above copolymer, vinyl toluene, and dicumyl peroxide. Mistron talc can be incorporated therein and the mix can be subsequently cured at a temperature of 300° F. to form a hard resin with superior dielectric strength.

*Example VI*

Fourteen plies of 181 glass cloth with a vinyl silane finish thereon can be impregnated with the resinifiable polymer mix of Example V, placed in layers in a press mold, and cured at 300° F. for ½ hour to provide laminates which have relatively high dielectric strength.

*Example VII*

Mistron talc can be also added to paraffin and microcrystalline wax. Petroleum asphalts can also have this talc incorporated therein. An increase in dielectric strength is realized in both types of these materials.

*Example VIII*

The following formulations were provided as shown herebelow.

TABLE VIII

|  | 0 | 1 | 2 | 3 | 4 | 5 | 6 |
|---|---|---|---|---|---|---|---|
| Geon 101 (PVC)[1] | 100 | 100 | 100 | 100 | 100 | 100 | 100 |
| Didecylphthalate | 52 | 52 | 52 | 52 | 52 | 52 | 52 |
| Dibasic lead phthalate | 6 | 6 | 6 | 6 | 6 | 6 | 6 |
| Dibasic lead stearate | 1 | 1 | 1 | 1 | 1 | 1 | 1 |
| Bisphenol A | 0.1 | 0.1 | 0.1 | 0.1 | 0.1 | 0.1 | 0.1 |
| Mistron Vapor Talc | 15 | 30 | 50 |  |  |  |  |
| Calcined Clay |  |  |  | 15 | 30 | 50 |  |
| Whiting |  |  |  |  |  |  | 30 |
| Tensile, p.s.i. | 2,600 | 2,550 | 2,250 | 2,500 | 2,350 | 2,000 | 2,550 |
| Modulus 200%, p.s.i. | 2,200 | 2,300 | 2,200 | 2,100 | 2,000 | 1,850 | 2,000 |
| Elongation, percent | 305 | 295 | 260 | 310 | 315 | 265 | 350 |
| Hardness, Shore "A" | 92 | 94 | 95 | 92 | 93 | 94 | 91 |
| Dielectric Strength,[1] Volts/Mil | 2,000 | 2,060 | 2,160 | 1,670 | 1,790 | 1,810 | 1,810 |
| Dielectric Constant | 4.61 | 4.62 | 4.59 | 4.65 | 4.63 | 4.76 | 4.83 |
| Power Factor, percent | 8.5 | 8.2 | 7.7 | 8.4 | 8.1 | 7.8 | 8.2 |
| D.C. Resistivity, ohm-cm.×$10^{14}$ | 1.6 | 6.7 | 5.6 | 13 | 9.9 | 13 | 0.3 |

[1] Polyvinyl chloride.
[2] A PVC composition without a mineral filler has a dielectric strength of 2,000 volts/mil.

This example also illustrates the superiority obtained by employing Mistron vapor talc in a thermoplastic material.

Having set forth the general nature and embodiments of the present invention, the true scope is particularly pointed out in the appended claims.

What is claimed is:

1. A process for increasing the dielectric strength of a nonelastomeric material selected from the group consisting of polyolefins produced from monoolefins of from 2 to 12 carbon atoms per molecule, polyvinyl chloride, polydiolefins produced from conjugated diolefins of from 4 to 6 carbon atoms per molecule and copolymers of said diolefins with ethylenically unsaturated monomers, polydiolefins produced from conjugated diolefins of from 4 to 6 carbon atoms per molecule admixed with monomeric crosslinking agents, and copolymers of conjugated diolefins with ethylenically unsaturated monomers admixed with monomeric crosslinking agents, which comprises adding a talc comprising essentially platy particles, as a filler, to said material in sufficient amounts to obtain a final composition having a dielectric strength of more than 1,000 volts per mil.

2. A process as in claim 1 in which the nonelastomeric material is polyethylene.

3. A process as in claim 1 in which the nonelastomeric material is polypropylene.

4. A process as in claim 1 in which the nonelastomeric material is a thermosetting resinifiable polymer which is subsequently cured with an organic peroxide to produce a thermoset resin composition.

5. A process as in claim 4 in which the nonelastomeric material is a resinifiable butadiene-styrene copolymer and which after the addition of said talc, is cured with an organic peroxide.

6. A composition comprising a talc comprising essentially platy particles, as a filler, compounded with a nonelastomeric material selected from the group consisting of polyolefins produced from monoolefins of from 2 to 12 carbon atoms per molecule, polyvinyl chloride, polydiolefins produced from conjugated diolefins of from 4 to 6 carbon atoms per molecule and copolymers of said diolefins with ethylenically unsaturated monomers, polydiolefins produced from conjugated diolefins of from 4 to 6 carbon atoms per molecule admixed with monomeric crosslinking agents, and copolymers of conjugated diolefins with ethylenically unsaturated monomers admixed with monomeric crosslinking agents, said composition containing a sufficient amount of said talc to have a dielectric strength of more than 1,000 volts per mil.

7. A composition as in claim 6 wherein the nonelastomeric material is polyethylene.

8. A composition as in claim 6 wherein the nonelastomeric material is polypropylene.

9. A composition as in claim 6 wherein the nonelastomeric material is a thermosetting resinifiable polymer which is subsequently cured with an organic peroxide to produce a thermoset resin composition.

10. A composition as in claim 6 wherein the nonelastomeric material is a resinifiable butadiene-styrene copolymer and which, after the addition of said talc, is cured with an organic peroxide.

References Cited in the file of this patent

UNITED STATES PATENTS

| 1,645,758 | Kemp | Oct. 18, 1927 |
| 1,980,387 | Del Mar | Nov. 13, 1934 |
| 2,105,362 | Nowak et al. | Jan. 11, 1938 |
| 2,564,397 | Duddy | Aug. 14, 1951 |
| 2,844,486 | Lamar | July 22, 1958 |

OTHER REFERENCES

Johnstone: "Minerals for the Chemical and Allied Industries," John Wiley and Sons Inc., 1954, pages 493–507.

"Compounding Ingredients for Rubber," 3rd edition, 1961, Bill Brothers Publishing Corp., page 325.

Ladoo et al: Nonmetallic Minerals, Oct. 5, 1956, pages 531–544.

Zimmerman et al.: "Handbook of Material Tradenames," Industrial Research Service, Dover, Del., 1953 ed., page 372.